UNITED STATES PATENT OFFICE.

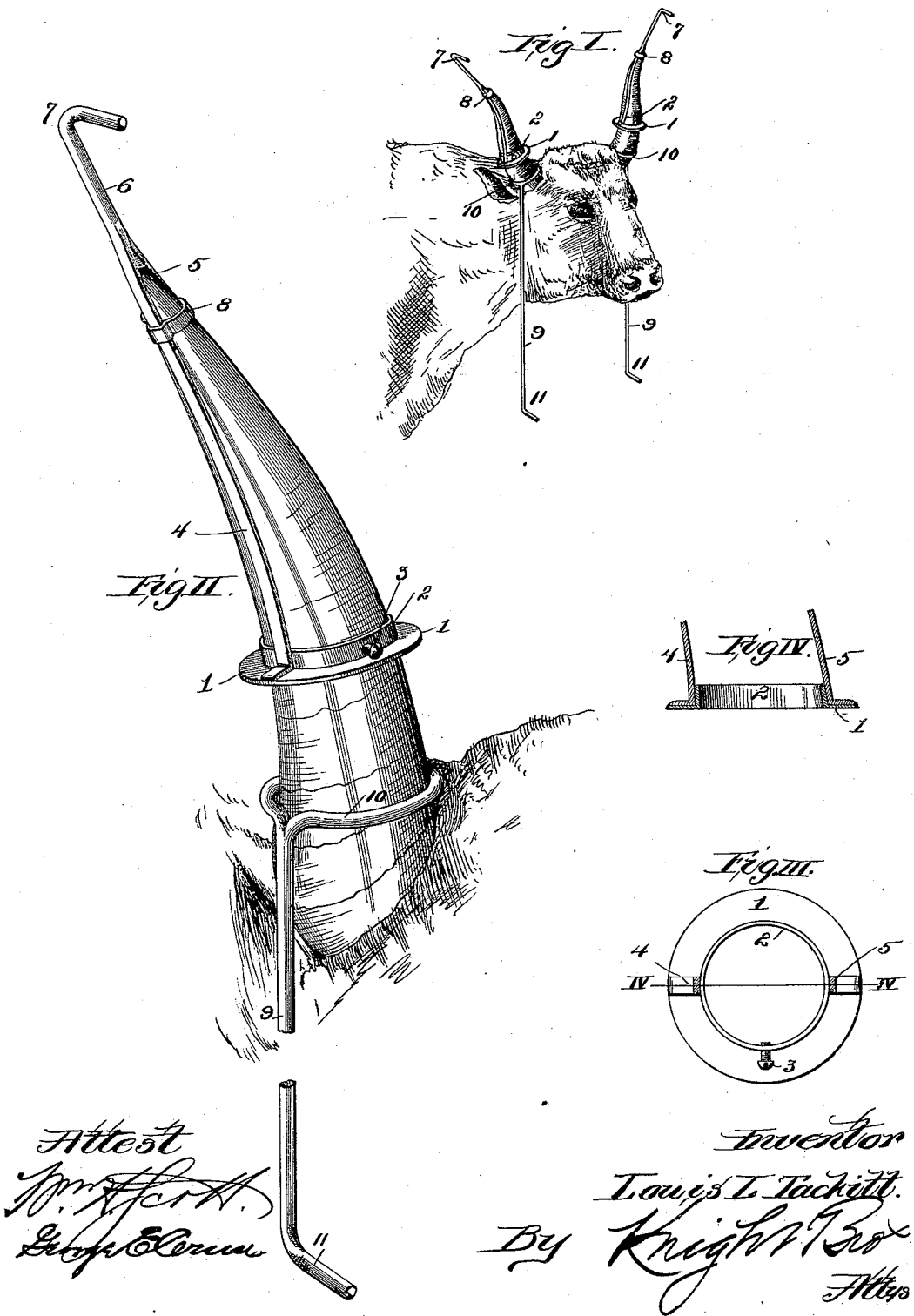

LOUIS L. TACKITT, OF KASOGA, TEXAS.

GUARD FOR HORNED STOCK.

SPECIFICATION forming part of Letters Patent No. 486,743, dated November 22, 1892.

Application filed May 10, 1892. Serial No. 432,502. (No model.)

*To all whom it may concern:*

Be it known that I, LOUIS L. TACKITT, of Kasoga, in the county of Knox and State of Texas, have invented a certain new and useful Improvement in Guards for Horned Stock, of which the following is a full, clear, and exact description, reference being had to the accompanying drawings, forming part of this specification.

This invention consists in a device for application to the horn of an animal for preventing horned animals—such as cattle and goats—from going through or jumping over wire fences; and it consists in features of novelty hereinafter fully described, and set forth in the claims.

Figure I is a view showing my invention attached to the horns of a cow. Fig. II is an enlarged view in elevation illustrating my invention applied to an animal's horn. Fig. III is a top view of the upper-attachment-supporting ring, the two arms that support the hook being shown in section. Fig. IV is a section taken on line IV IV, Fig. III.

Referring to the drawings, 1 represents an annular ring provided with a circular collar or flange 2 the ring and collar or flange being secured to the horn of an animal by means of a set-screw, tack, or other fastening device 3.

Secured to the annular ring 1 at two of its sides are arms 4 and 5, joined at their upper ends to form a solid rod 6, whose end is bent into a hook 7.

8 is a band that engages the upper ends of the two bars 4 and 5, and thus supports and strengthens the rod 6 when any strain is brought against the hook.

9 is a rod or wire whose upper end is in form of a ring 10, at right angles thereto, that encircles the horn and whose lower end is bent to form a hook 11. This rod 9 hangs loosely upon the horn and is at liberty to swing backward and forward to some extent; but cannot become detached from the horn nor rise on the horn farther than the annular ring 1, owing to the fact that the annular ring 1 is larger than the ring 10, and thus prevents the ring 10 from passing it.

It will be seen that where the horns of a cow or other horned animal are provided with my attachments it is practically impossible for the animal to go through or jump over a wire fence. As the animal attempts to go between or under the wires the hooks 7 above its head will catch the fence-wire, and thus stop the progress of the animal; whereas if the animal attempts to jump over the fence the hooks 11 of the rods 9 below the animal's head will catch the fence-wire and force the animal back. The attachments may be of any desired length, and may be constructed of iron rods or of wire, and may be of greater weight or strength as desired and as the needs may demand.

I have shown my attachments as applied to both horns of an animal; but I do not wish to confine myself to so attaching them, as it is evident that either one or both of the attachments could be left off of one or other of the horns, as might be desired, and in this case would prove quite effectual in instances of small or unobstreperous animals.

I claim as my invention—

1. A guard for horned stock, consisting of a rod 6, having a hook 7 and a suitable support 4 5, and means by which the support is fastened to the horns, substantially as described.

2. A guard for the horns of an animal, consisting of an annular ring 1, having a collar 2 and a fastening device, and the upwardly-extending arms 4 and 5, secured to the ring, having their upper ends joined together for providing a solid rod 6, formed with a hook 7, substantially as described.

3. A guard for the horns of an animal, consisting of an annular ring 1, having a collar 2 and a fastening device, the upwardly-extending arms 4 and 5, secured to the ring, having their upper ends joined together for providing a solid rod 6, formed with a hook 7, and the strengthening-band 8 for engaging the upper ends of the arms, substantially as described.

LOUIS L. TACKITT.

In presence of—
J. J. TRUSCOTT,
H. F. YOUNG.